G. H. NEEDHAM.
ILLUMINATED LICENSE PLATE.
APPLICATION FILED MAY 17, 1919.
1,376,220.
Patented Apr. 26, 1921.
2 SHEETS—SHEET 1.
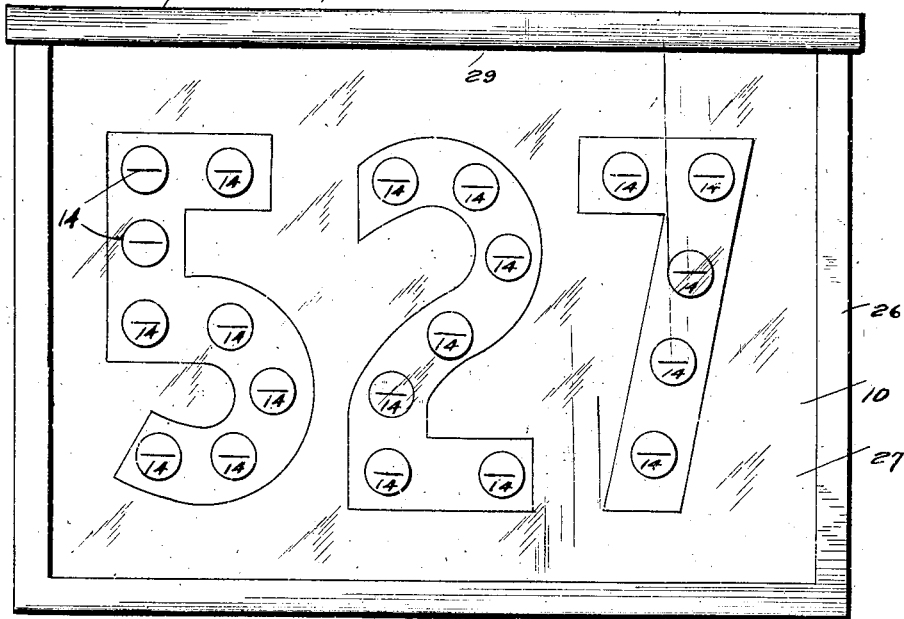
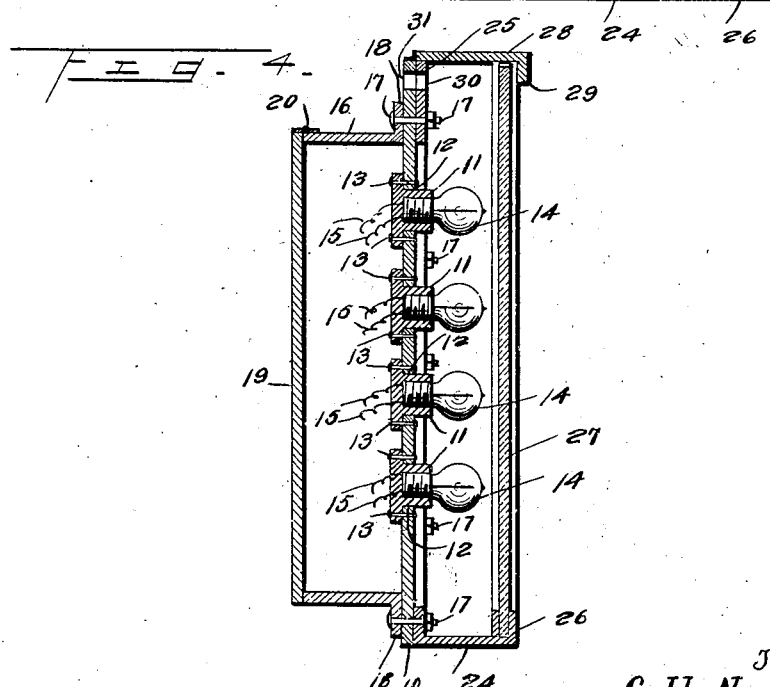
Inventor.
G. H. Needham.
Attorney G. H. NEEDHAM.
ILLUMINATED LICENSE PLATE.
APPLICATION FILED MAY 17, 1919.
1,376,220.
Patented Apr. 26, 1921.
2 SHEETS—SHEET 2.
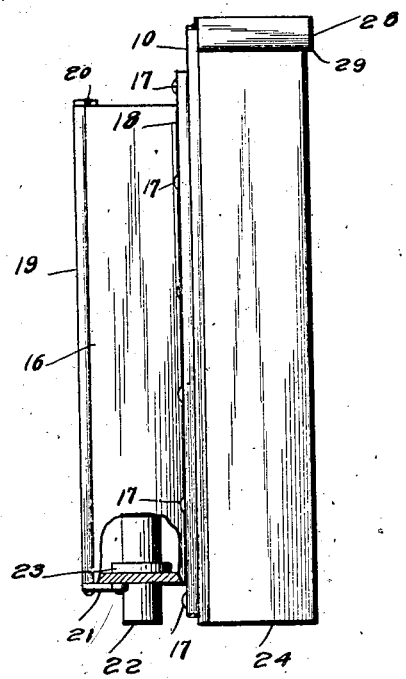
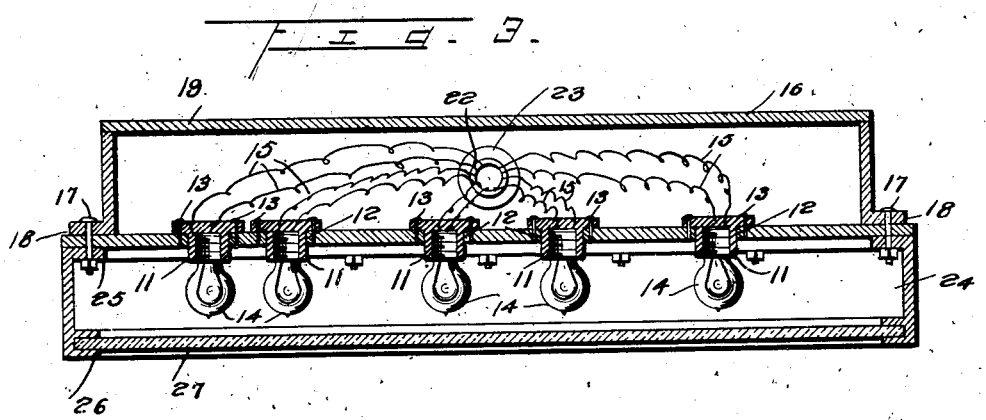
Inventor.
G. H. Needham.
By ⟨signature⟩
Attorney.

UNITED STATES PATENT OFFICE.

GEORGE HENRY NEEDHAM, OF NEWARK, NEW JERSEY, ASSIGNOR OF ONE-HALF TO GEORGE JACOB NEEDHAM, OF NEWARK, NEW JERSEY.

ILLUMINATED LICENSE-PLATE.

1,376,220.  Specification of Letters Patent.  Patented Apr. 26, 1921.

Application filed May 17, 1919. Serial No. 297,741.

*To all whom it may concern:*

Be it known that I, GEORGE HENRY NEEDHAM, a citizen of the United States, residing at Newark, in the county of Essex and State of New Jersey, have invented certain new and useful Improvements in Illuminated License-Plates; and I do hereby declare the following to be a full, clear, and exact description of the invention, such as will enable others skilled in the art to which it appertains to make and use the same.

My invention relates to improvements in automobile license plates and more particularly to illuminating means therefor.

An important object of this invention is to provide a license plate having novel means for supporting a plurality of electric light bulbs whereby the number on the license plate may be plainly seen at night.

A further object of the invention is to provide novel means for attaching a globe casing and a wire box to the license plate to protect the globes and the wires therefor.

A further object of the invention is to provide a device of the character described which is of highly simplified construction, few in parts and desirable in use.

Other objects and advantages of the invention will be apparent during the course of the following description.

In the accompanying drawings forming a part of this application and in which like numerals are employed to designate like parts throughout the same, Figure 1 is a front elevation of a device embodying my invention, Fig. 2 is an end elevation of the same, Fig. 3 is a horizontal section through the same, and Fig. 4 is a vertical transverse section through the same.

In the drawings wherein for the purpose of illustration is shown the preferred embodiment of my invention, the numeral 10 designates a license plate bearing the license number on its front face.

With the space occupied by each figure of the license number I have provided a suitable number of electric light sockets 11 extended through openings 12 in the license plate and secured to said license plate by suitable bolts 13 or other fastening means. Electric lights 14 are arranged in the sockets 11 and are obviously adapted for illuminating the several figures of the number. Electric wires 15 are connected to the sockets 11 and extend from a suitable source of electric energy. A wire box 16 is secured to the rear side of the license plate by bolts 17 extending through outwardly extending flanges 18 carried by the wire box.

As illustrated in Fig. 4 the top of the wire box terminates below the top of the license plate. As illustrated in the several figures the wire box 16 is rectangular and is provided at its rear side with a back 19 horizontally hinged thereto by hinges 20. Suitable fastening means 21 are provided at the bottom of the back 19 for retaining the same locked. A wire conduit 22 is extended through the bottom of the wire box and protects the electric wires. An annular flange 23 carried by the conduit 22 intermediate its ends serves to secure the conduit to the bottom of the wire box.

A light protecting casing 24 is arranged at the front of the license plate and is adapted to prevent mud and other objectionable material from lodging on the light. As illustrated in Fig. 4 the casing 24 is provided with inwardly extending flanges 25 at its rear side for receiving the bolts 17 which in addition to securing the wire box to the plate secure the casing in position. The front inner sides of the side walls and bottom of the casing 24 are provided with inwardly extending spaced parallel guideways 26 forming grooves for the reception of a glass 27 arranged in front of the electric light. The glass 27 may be removed out through the top of the casing for cleaning purposes and for the purpose of replacing the lights when the same burn out and so forth. A cover 28 is hingedly secured to the top of the casing and is provided with an overhanging depending flange 29. The cover may be raised for removing the glass 27. The flange 25 provided in the upper portion of the casing 24 has transverse openings 30 alining with the usual openings 31 in the license plate for receiving a supporting element.

In the use of my invention suitable supporting means are attached to the plate as described and the device is thereby arranged in position. As described the lights illuminate the figures of the number with a high degree of efficiency and are protected by the casing 24.

Having thus described my invention, what I claim is:—

An illuminated license plate comprising a lamp carrying member having spaced openings therethrough, lamp sockets secured in said openings, lamps removably mounted in said sockets and extended outwardly, an outer casing having inturned flanges around its inner side engaged against the outer face of said lamp carrying member, a transparent plate removably secured in the outer side of said outer casing, a cover for said outer casing normally closed over the upper edge of said transparent plate, a comparatively small rear casing having outturned flanges around one edge engaged against the rear face of said lamp carrying member opposite the flanges of the outer casing, connecting members secured through the edge portions of said lamp carrying member and through the parallel flanges of the said outer and rear casings, a tube extended into said rear casing for current conducting wires leading to the lamp socket, and a normally closed door for the rear side of said rear casing.

In testimony whereof I affix my signature in presence of two witnesses.

GEORGE HENRY NEEDHAM.

Witnesses:
    FRED REIM,
    Mrs. F. REIM.